Sept. 27, 1932. T. H. STRACHAN ET AL 1,879,585

WEIGHT RACK FOR SCALES

Filed Dec. 19, 1930

INVENTOR
Thomas H. Strachan
William H. Fryer
BY ATTORNEY
A. C. Mabry

Patented Sept. 27, 1932

1,879,585

UNITED STATES PATENT OFFICE

THOMAS H. STRACHAN AND WILLIAM H. FRYER, OF DAYTON, OHIO, ASSIGNORS TO DAYTON SCALE COMPANY, OF DAYTON, OHIO, A CORPORATION OF NEW JERSEY

WEIGHT RACK FOR SCALES

Application filed December 19, 1930. Serial No. 503,356.

The present invention relates to weighing scales in general and has particular reference to racks used to hold the load counter-balancing weights used in connection with scales of the even balance type.

The primary object of the present invention is to provide a novel and improved weight rack which may be used in connection with a scale of the type disclosed in Letters Patent No. 1,746,251 granted February 11, 1930, to W. N. Gilbert, which is of the type commonly known in the art as an even balance scale.

An object of the present invention is to provide a novel and improved weight rack which is arranged to be readily attached to or detached from the scale without the use of tools or the necessity of making alterations in the scale.

Another object is to provide a convenient and accessible weight rack which is simple in construction and may be cheaply manufactured.

A further object is to provide a weight rack which cannot be accidentally displaced relative to the scale although said rack is not permanently fastened to the scale.

Another object is to provide an improved weight rack which does not require any extra parts such as screws or bolts in order to attach the rack to the scale.

Various objects, advantages, or features of the present invention will be pointed out in the following specification and claim or will be apparent after a study thereof and of the accompanying drawing.

Figure 1:
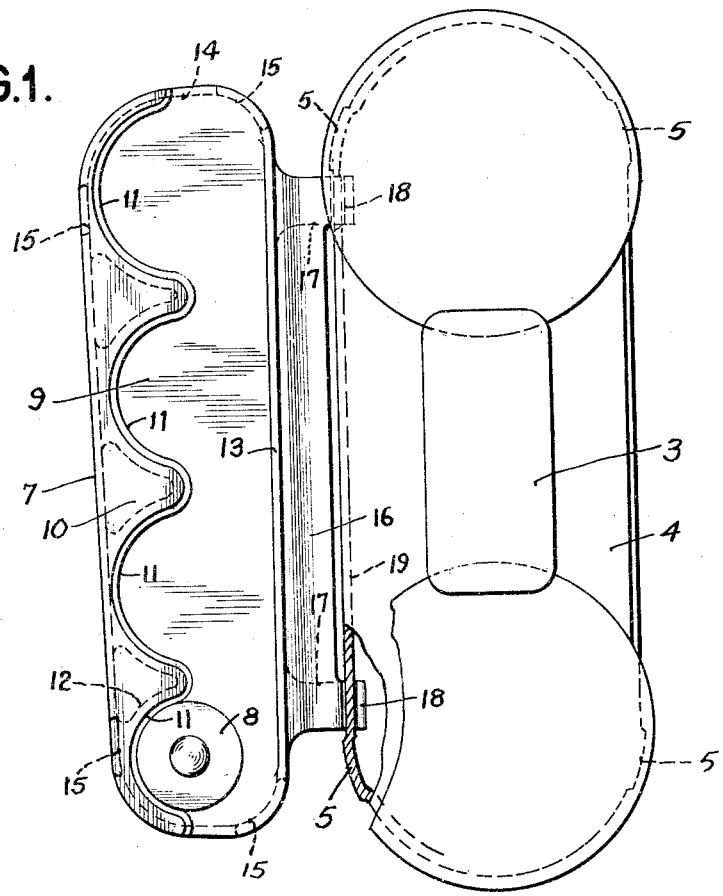
Fig. 1 is a top plan view of a weight rack embodying the present invention and illustrates the manner of attaching the rack to the scale.

The scale is indicated generally by the numeral 3 and has a frame provided with a suitable base 4 which is generally oblong in shape as shown in Fig. 1. The base 4 is supported upon short feet 5 which raise the base a short distance from the surface 6 upon which the scale rests. The recesses formed between the feet 5 are advantageously utilized to hold the weight rack in place in a manner to be described hereinafter.

The weight rack 7 is preferably composed of an integral casting oblong in shape and smoothly rounded at both ends. As will be observed in Fig. 1, the weight rack is slightly tapered in a longitudinal direction owing to the difference in diameter of the weights of which the numeral 8 indicates a typical style. The surface 9 on which the weights 8 rest is inclined relative to the surface 6 and slopes downwardly in a direction away from the base 4 of the scale. The front part 10 (along and adjacent the left edge of surface 9 as shown in the drawing) of the rack is raised a substantial distance above the surface 9 and is provided with a number of recesses 11 acting as abutments against which the weights 8 rest, each of the recesses being of about the same general contour as the weights to be retained therein. The walls of the recesses 11 are inclined at an obtuse angle with the surface 9 in order to avoid sharp corners and thereby ensure a clean and smooth casting. The portion of the rack underneath the surface 10 and between the recesses 11 is hollowed out substantially as at 12 in order to make the casting forming rack 7 as light as possible without sacrificing strength. The upper rear edge of the rack 7 (along the right edge of surface 9 as shown in the drawing) is provided with a longitudinal rib 13 which prevents the weights 8 from being accidentally knocked off the surface 9 and down between the rack and the base of the scale and thereby prevents marring the finish of the scale which might otherwise result if the weights should be accidentally knocked toward the said base.

The underside of the casting comprising the rack 7 is hollow beneath the surface 9 and the walls 14 formed thereby are shaped with low feet 15 which rest upon the surface 6. Extending longitudinally of the rib 13 and merging therewith is a rearwardly and downwardly projecting rib 16 which, when the rack 17 has been attached to the scale, just falls short of touching the lower front edge of the base 4, the purpose of the rib 16 being to prevent anything from slipping down between the rack 7 and the base of the scale and getting beneath the latter and also to provide a neat and harmonious line of joinder between the rack and the base of the scale. Each end of the rib 16 has a laterally extending or offset rib 17 joined to the rear wall 14 of the rack 7 and merging therewith in a smooth surface of joinder as shown in Fig. 1. The ribs 17 are purposely made quite thick and rugged in comparison with the thickness of other parts or walls of the casting as a whole and extend further rearwardly, or to the right as indicated in the drawing, than the rear edge of rib 16. A hook 18, formed at the free end of each rib 17 just referred to, is adapted to engage in an interlocking fashion with the underside of the lower front edge 19 of the base 4 in the recess formed between the two front feet 5 of base 4 and thereby preventing accidental displacement of the rack 7 in a direction transverse to the base 4. It will be noted that the rib 16 is slightly shorter than the distance between the two front feet 5 of the base 4 and that both of the hooks 18 engage the front edge of the base 4 adjacent the feet 5 and thereby prevent longitudinal as well as lateral displacement of the rack 7 relative to the base 4.

Figure 2:
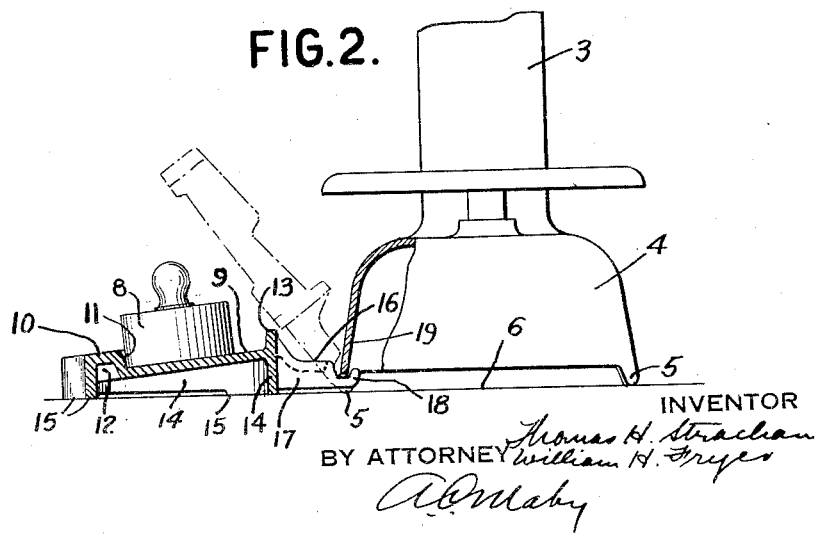
Fig. 2 is an end view of the base of the scale and the weight rack, the latter being shown partly in section.

It will be perceived that the only operation necessary to detach the rack 7 from the base of the scale is to remove the weights 8 and then lift up the front edge of the rack thereby rocking it clockwise by a pivotal movement about the interlocking portions to the position shown in broken lines in Fig. 2 so as to unhook the rack from the lower front edge 19 of the base 4. The weights 8 resting upon the rack, as well as the weight of the body of the rack, tends to prevent any possibility of the rack being accidentally displaced relative to the scale.

The ease of attachment or detachment of the rack 7 without the use of additional parts constitutes one of the novel features of the present invention. Among its other features and advantages are the unitary casting having no sharp corners to cause trouble in the casting process, the cheapness of the construction, its harmonizing appearance when attached to the scale base, and its accesibility and convenience to a user of the scale. The fact that it is not directly fastened to the scale makes it possible either to furnish it with the scale or not as the purchaser of the scale desires.

This invention has been illustrated and described as embodied in a specific form and in connection with a particular scale, however, it is limited to neither the illustrative form nor the scale shown as it is capable of modification to suit the wishes of the user of the scale or to adapt it to different scales in order to meet varying conditions found in practice.

We claim:

A rack for the weights used on a scale comprising an oblong integral structure, said structure having an inclined surface upon which said weights may rest, a raised portion extending longitudinally of one edge of said surface and recessed to retain said weights in spaced relation on said surface, and a rib extending longitudinally of the opposite edge of said surface for preventing said weights from being slidably displaced from the recesses in the raised portion, and having offset portions for detachably and pivotally connecting said structure to the scale whereby to retain said structure in spaced relation to the scale against accidental displacement relative to the latter.

In testimony whereof we hereto affix our signatures.

THOMAS H. STRACHAN.
WILLIAM H. FRYER.